United States Patent
Janach

(10) Patent No.: US 6,196,204 B1
(45) Date of Patent: Mar. 6, 2001

(54) METHOD AND DEVICE FOR FORMING A TURBULENT FUEL-AIR MIXTURE IN THE COMBUSTION CHAMBER OF EACH CYLINDER OF AN INTERNAL COMBUSTION ENGINE CONTROLLED WITH VALVE TIMING

(75) Inventor: Walter Janach, Horw (CH)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 08/737,200

(22) PCT Filed: Feb. 23, 1996

(86) PCT No.: PCT/DE96/00281

§ 371 Date: Nov. 7, 1996

§ 102(e) Date: Nov. 7, 1996

(87) PCT Pub. No.: WO96/28649

PCT Pub. Date: Sep. 19, 1996

(30) Foreign Application Priority Data

Mar. 9, 1995 (CH) .................................................. 676/95

(51) Int. Cl.⁷ .................................................. F02M 21/04
(52) U.S. Cl. .................................................. 123/527
(58) Field of Search .................................. 123/527, 306, 123/429, 298

(56) References Cited

U.S. PATENT DOCUMENTS

| 4,450,803 | * | 5/1984 | Namba | 123/308 |
| 5,101,794 | | 4/1992 | Van Blaricom . | |
| 5,150,691 | * | 9/1992 | Imajo | 123/308 |
| 5,370,098 | * | 12/1994 | Lida | 123/527 |

FOREIGN PATENT DOCUMENTS

| 309 044 B1 | | 3/1989 | (EP) . | |
| 3731986 | | 3/1989 | (DE) . | |
| 0510585 | | 10/1992 | (EP) . | |
| 2548278 | | 1/1985 | (FR) . | |
| 2263309 | * | 7/1993 | (GB) | 123/527 |
| 77152 | * | 5/1958 | (JP) | 123/527 |
| 17657 | * | 1/1994 | (JP) | 123/527 |

OTHER PUBLICATIONS

Peschka, "Liquid Hydrogen Fueled Automotive Vehicles in Germany—Status and Development", Intl. Journal of Hydrogen Energy, Nov. 1, 1986, pp. 721–728.

Gauthier, "Natural Gas Vehicle Developments—A Gas Industry and Original Equipment Manufacturer Cooperative Effort", Amer. Institute of Chem. Engineers, Aug. 17, 1990.

* cited by examiner

Primary Examiner—John T. Kwon
(74) Attorney, Agent, or Firm—Kenyon & Kenyon

(57) ABSTRACT

In an internal combustion engine, which is operated with gaseous fuel, each intake passage has an intake valve, and a gas-injection nozzle is arranged in the end region of each intake passage outside of the combustion chamber. The gas-injection nozzle is used to form a coherent gas spray, which is injected at a high velocity directly into the combustion chamber in the cylinder. The gas spray is injected intermittently and is coordinated with the opening movement of the intake valve. The gas spray of gaseous fuel is first mixed with the air in the combustion chamber, where the high kinetic energy of the gas spray produces a high turbulence and results in an efficient mixing of the fuel with the air.

20 Claims, 2 Drawing Sheets

METHOD AND DEVICE FOR FORMING A TURBULENT FUEL-AIR MIXTURE IN THE COMBUSTION CHAMBER OF EACH CYLINDER OF AN INTERNAL COMBUSTION ENGINE CONTROLLED WITH VALVE TIMING

FIELD OF THE INVENTION

The present invention relates to a method for forming a turbulent fuel-air mixture in the combustion chamber of each cylinder of an internal combustion engine controlled with valve timing, as well as to a device for implementing this method.

BACKGROUND INFORMATION

The operation of internal combustion engines using gaseous fuels requires properly adapted devices and mixing methods for forming a fuel-air mixture, as well as for supplying this mixture to the combustion chamber in the cylinders of the internal combustion engine. The gaseous fuel is mixed for the most part upstream from the combustion chamber in the area of the air intake passages and then flows during the intake stroke into the combustion chamber(s) of the internal combustion engine. The European Patent 309 044 B1 already discloses a mixture and regulating device of this type, which is arranged in the engine air-intake line. Air and gaseous fuel are thereby mixed in a so-called venturi tube, and this fuel-air mixture then flows, as is generally known, into the engine. As is apparent from this known device, it is relatively expensive and difficult to regulate the mixture ratio, and there is no guarantee of a thorough and uniform intermixing of air and gaseous fuel. The result is uneven combustion of the mixture in the combustion chamber of the engine, so that no optimal energy utilization is possible and undesirable pollutants are formed. To ensure an effective combustion of the gas-air mixture in the combustion chamber, additional measures are, therefore, needed to generate a turbulent flow of the mixture, the aim being to achieve a thorough intermixing and rapid combustion. As is known, additional turbulence is generated when the mixture stream flows at the end of the intake passage through the annular gap between the valve and the valve seat at the cylinder head, through which means a conical mixture spray is formed. It is also known to increase turbulence by applying a rotational energy to the mixture stream flowing into the cylinder by shaping the intake passage accordingly or by installing interior components upstream from the intake valve. Furthermore, a so-called squish effect is produced in the cylinders of present-day engines in that as the piston approaches the top dead center between the piston and the cylinder head, a narrower and narrower gap is formed, so that the mixture is squeezed out of this gap into a central combustion chamber recess. This also has the effect of intensifying turbulence. The disadvantage associated with all of these known measures for increasing turbulence in the combustion chamber is that the intensity of the turbulence varies more or less in proportion to the engine speed. This is because the velocity of the air, gas, and mixture flows changes in response to variations in engine speeds. Therefore, at low speeds, the turbulence is weak and, accordingly, combustion is poor. This effect becomes especially pronounced when natural gas is used as fuel and/or when a lean mixture is used. However, at high speeds, the flow velocities are so high that it is more difficult to ignite the mixture. At high speeds, that is at high flow velocities, an intensive vortex flow through the intake valve also results in a considerable loss of pressure, so that cylinder charging and, thus, power output are diminished. To compensate for these disadvantages, compromises have to be made, for the most part, when working the internal combustion engines that use gaseous fuels, or additional complicated and expensive measures have to be resorted to.

SUMMARY OF THE INVENTION

The object of the present invention is to conceive of a method and a device, which when applied to internal combustion engines that use gaseous fuels, such as natural gas or liquefied petroleum gas, will generate a high turbulence of the mixture in the combustion chamber. The intensity of the turbulence should be as constant as possible, independently of the engine speed, the intention being to use simple means.

The supplying of the gaseous fuel should permit an efficient and simple controlling and regulating of the mixture formation, as well as of the engine function. Furthermore, it should be possible to use gaseous fuels in conventional engines with very little adaptation, and the elements required for supplying the gaseous fuel should be protected from excessive stresses, e.g. from thermal and compressive stresses, and have a correspondingly long service life.

The means for achieving the object in accordance with the present invention yields advantages in that the gaseous fuel and the air are not mixed until after (downstream from) the intake valve in the combustion chamber of each cylinder. Gaseous fuel is introduced via a valve-timed gas nozzle, which is arranged in the area of the intake passage, i.e., outside of the hot combustion chamber of the engine. Therefore, the thermal stresses of the gas nozzle are able to be kept within acceptable limits, so that correspondingly high service lives can be expected. The pressure under which the gaseous fuel is normally stored is high enough to produce a high-speed gas spray in the properly shaped gas injection nozzle. Because of the very low density of the gas compared to liquid gasoline and its compressibility, sonic velocity is reached when gaseous fuels are introduced by nozzle in the narrowest cross-section. The velocity can be increased even more in an outlet passage designed as a Laval nozzle. Thus, already at customary gas pressures of a few bar, e.g. 5 to 10 bar, a coherent gas spray with a flow velocity of 250–600 m/s can be produced. A coherent gas spray is understood to be a gas spray which essentially does not diverge and, thus, has a constant cross-section. The kinetic energy of such a gas spray is many times greater than that of a gasoline spray, given the same pressure. The kinetic energy of the fuel spray in the case of gas reaches more or less the same order of magnitude as the kinetic energy of the entire air flow through the intake valve, given a high speed. The present invention utilizes this high kinetic energy of the gas spray to produce a greatest possible turbulence in the combustion chamber. To this end, the coherent gas spray is injected through the annular gap of an open intake valve directly into the combustion chamber, where the kinetic energy being released causes the spray of gaseous fuel to mix intensively with the inducted air and to undergo vorticity.

The gas spray is injected intermittently, or rather as a pulsed spray, the instant of each injected pulse of gaseous fuel being dependent upon the opening of the annular gap at the intake valve. Therefore, the gas-injection nozzle is advantageously provided with a valve, which can be actuated, as is generally known, electromagnetically or otherwise. The fuel quantity required by the engine can be expediently regulated by modifying the time duration of the gas-spray pulse. This renders possible the application of control processes, as they are used in gasoline injection. Other advantages can result when the direction of the axis of the gas spray is selected in relation to the central axis of the combustion chamber, and the gas spray is thereby injected at an angle and/or eccentrically to the logitudinal axis of the combustion chamber. This makes it possible for an additional vortex to be generated in the combustion chamber, thus further intensifying turbulence. Additional advantages are attained in that the velocity of the injected gas spray is independent from the engine speed and, therefore, an intensive turbulence is also rendered possible in the combustion chamber given low engine speeds. As a result, one can do partially or entirely without supplementary measures for generating turbulence, so that the design and configuration, as well as the method for injecting the gaseous fuel, are simplified. If necessary, by shifting the timing of the gas pulse relative to the opening duration of the intake valve, it is also possible to inject only one portion of the quantity of gaseous fuel directly into the combustion chamber of the cylinder. By advancing the gas pulse, one portion of the fuel can be pre-stored in the intake passage; immediately upon opening of the intake valve, it then arrives, together with the air, in the cylinder. An operation of this type can be expedient given a high speed and large load, because the turbulence of the incoming air is intensive anyway at high speeds. For especially high power requirements, it is possible to arrange more than one gas-injection nozzle, the gas sprays being able to be injected into the combustion chamber through one or more intake valves. This arrangement makes it possible for additional adaptations to be made to different power and operating requirements of an engine. What is especially advantageous here is that the gas-injection nozzles are arranged outside of the combustion chamber of the engine anyway, and a combination with pre-stored fuel admixtures is possible. Such pre-stored fuel admixtures can be refined in the generally known manner.

DETAILED DESCRIPTION OF THE INVENTION

Figure 1:
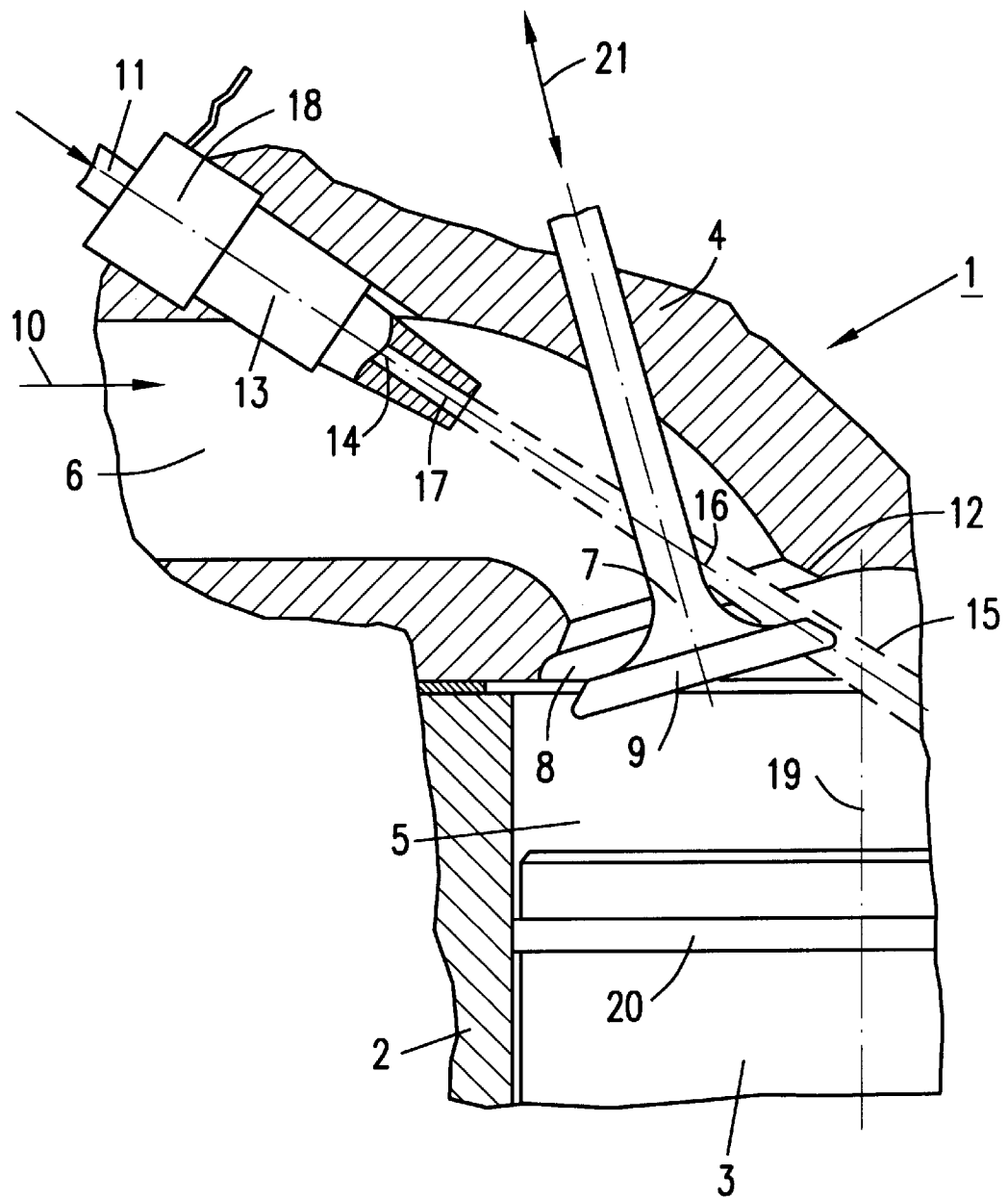
FIG. 1 shows the intake area of a cylinder of a combustion engine according to an embodiment of the present invention.

The detail shown in FIG. 1 of a combustion engine 1 shows only one part-sectional view in the area of an intake valve 7 and of the upper end of a cylinder 2. A piston 3 with a piston seal 20 is arranged in cylinder 2. Situated in the upper area of cylinder 2 is combustion chamber 5 with longitudinal axis 19, which, at the same time, is also the longitudinal axis of piston 3. Arranged on cylinder 2 is a cylinder head 4, which is equipped in the generally known manner with an intake passage 6 for supplying air in the direction of arrow 10, as well as with an outlet passage (not shown). Cylinder 2, piston 3, cylinder head 4, and the corresponding intake and outlet passages, as well as the valves have a generally known design, i.e., the entire engine 1 corresponds to a conventional configuration. Several cylinders 2 can be present and, per cylinder 2, also several intake passages 6 and intake valves 7, as well as several outlet passages and discharge valves. The intake valve 7 is shown in the open state, an annular gap 8 being formed between valve head 9 and valve seat 12 on cylinder head 4.

The movements of valve 7 in the direction of arrows 21 are controlled, as generally known, as a function of the piston movement, or of the combustion processes in combustion chamber 5. A gas-injection nozzle 13 is arranged on the intake passage 6, upstream from valve seat 12 at the end of said intake passage 6. This gas-injection nozzle 13 has a supply line 11 for gaseous fuel, e.g., for natural gas or liquefied petroleum gas, and is equipped with a solenoid valve 18 for releasing and interrupting the gas flow. An outlet passage 14, which is directed into intake passage 6, is configured at the front end of gas-injection nozzle 13. A gas spray 15 issues from this discharge passage 14 into intake passage 6, the flow axis 16 of gas spray 15 running through annular gap 8 of the open valve 7 and being aimed directly into combustion chamber 5. To increase the discharge velocity of the gas spray 15 out of gas-injection nozzle 13, end region 17 of discharge passage 14 is designed as a Laval nozzle and is adjusted, as is known per se, to the pressure of the gas streaming in. The gas spray 15 emerges with a velocity of about 250–600 m/s out of end region 17 of the discharge passage 14 and has a coherent structure. The coherent structure is to be understood in that, when it is injected into combustion chamber 5, gas spray 15 does not undergo any substantial enlargement of its cross-section in its path along flow axis 16, and mixes to the least possible extent with the air flowing through intake passage 6, in particular in the area of intake passage 6. The coherent form of gas spray 15 guarantees that it flows through annular gap 8 at the desired spot, and that no undesired deceleration is caused by contact with valve head 9 or with the wall regions of valve seat 12.

The high velocity of 250–600 m/s of the gas spray 15 emerging at discharge passage 14 imparts a very high kinetic energy to this gas stream. Because of the coherent form of gas spray 15, this high kinetic energy is retained until gas spray 15 enters into combustion chamber 5. In combustion chamber 5, impact against a wall causes gas spray 15 to fan out and disintegrate, and the high kinetic energy contained in gas spray 15 generates a high turbulence and, thus, a very efficient mixing of the gaseous fuel from the gas spray 15 with the air in combustion chamber 5. This high turbulence is not only effected by gas spray 15, but also by the air flowing in via annular gap 8 into combustion chamber 5, since this air flows in a conical shape into combustion chamber 5 and, likewise, exhibits an elevated flow velocity. The flow velocity of the air flowing out of intake passage 6 into combustion chamber 5 is dependent upon the speed of the engine, that is upon the stroke rate of piston 3. On the other hand, however, the flow velocity of gas spray 15 is independent of the engine speed. Therefore, when working with this type of injection of gaseous fuel into combustion chamber 5 as set forth by the present invention, the high turbulence and the efficient mixing of gaseous fuel and air is guaranteed over the entire speed range of internal combustion engine 1. The high turbulence and efficient mixing is still guaranteed at low speeds, as well.

Figure 2:
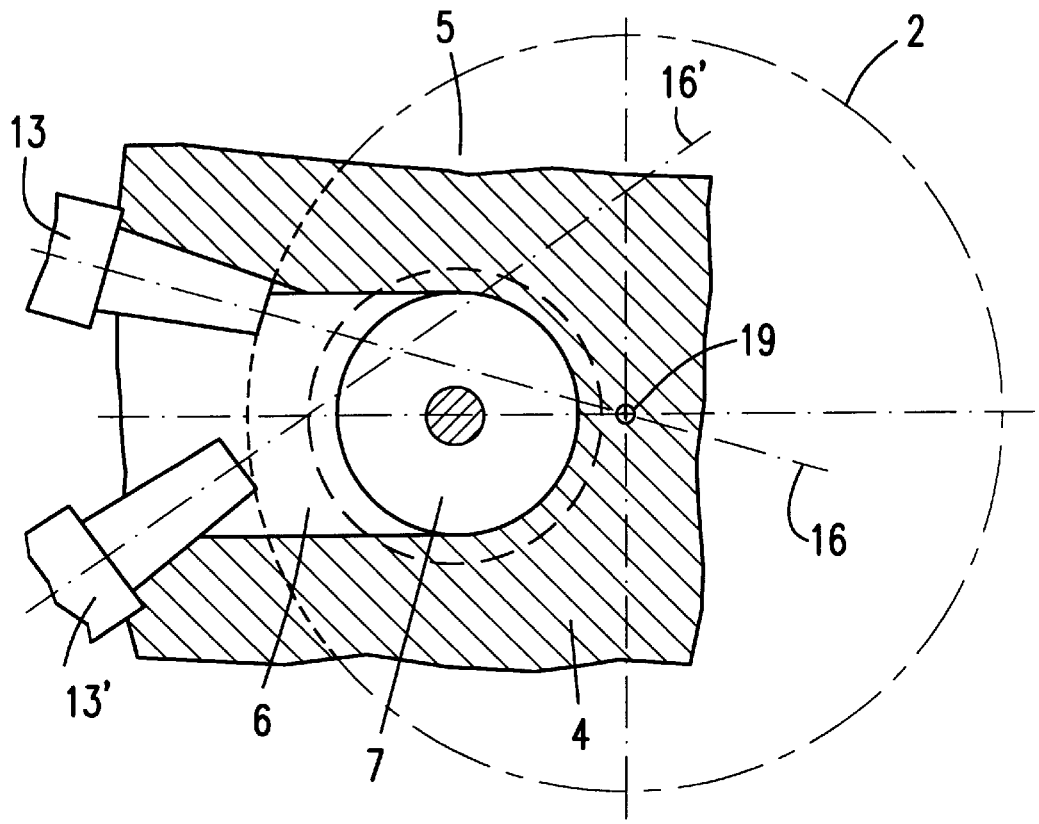
FIG. 2 shows a cross-section through an intake passage of a combustion engine with two gas-injection nozzles according to an embodiment of the present invention.

In a simplified and schematic representation, FIG. 2 shows a plan view of the intake area of intake passage 6 at a cylinder 2. The configuration has, per se, the same design as shown in FIG. 1, two gas-injection nozzles 13 or 13' being arranged, however. This configuration can be beneficial when the intention is to distribute the required gaseous fuel over two nozzles, it also being possible in this case, in dependence upon the operating state of combustion engine 1, to switch one of the two nozzles on or off. One can also perceive in FIG. 2 that the flow in combustion chamber 5 at cylinder 2 can be influenced by varying the alignment of flow axes 16 or 16' and of gas spray 15. The flow axis 16 of gas nozzle 13 runs through annular gap 8 of valve 7 and, after entering into combustion chamber 5, through longitudinal axis 19 of combustion chamber 5. In deviation therefrom, after passing through annular gap 8 at intake valve 7, the flow axis 16' of gas-injection nozzle 13' is introduced into combustion chamber 5, eccentrically to its longitudinal axis 19. This alignment of flow axes 16 or 16' with respect to longitudinal axis 19 is able to be varied within a broad range and adapted to the special structural refinement of specific shapes of piston 3, or of combustion chamber 5. To this end, it is also possible to bend discharge passage 14, or its longitudinal axis relative to the longitudinal axis of gas-injection nozzle 13. This will enable already existing bore holes to be used quite simply for the assembly of the nozzles. The adaptation is carried out through alignment of discharge passage 14. Gas-injection nozzle 13 is configured so as not to impede in any way flow and combustion processes in combustion chamber 5, as it is arranged outside of combustion chamber 5 in intake passage 6. Therefore, gas-injection nozzle 13 is also protected from any excessive stress and damage from combustion heat or high pressure, thus leading to an improved operational reliability and service life.

A turbulent fuel-air mixture is first formed in combustion chamber 5 of cylinder 2 in accordance with the method of the present invention. The gaseous fuel is supplied to gas-injection nozzle 13 via fuel supply line 11 under a pressure suitable for the fuel, e.g., 5 to 10 bar. When intake valve 7 opens during the intake stroke of piston 3, annular gap 8 is released, and air flows out of intake passage 6 via air supply line 10 into combustion chamber 5. At the appropriate moment, solenoid valve 18 at gas-injection nozzle 13 releases the inflow of gaseous fuel out of fuel supply line 11, and coherent gas spray 15 is formed in outlet passage 14 at gas-injection nozzle 13. This gas spray 15 is blown, virtually without mixing with the air flowing in, through the end region of intake passage 6 and through annular gap 8 at the open intake valve 7 into combustion chamber 5. It is first here that the gaseous fuel, which is contained in gas spray 15, mixes with the air, the high kinetic energy of gas spray 15, in combination with the inflow velocity of the air, assuring an intensive intermixing and turbulence, thus guaranteeing an optimal mixture formation. As a function of the movement of intake valve 7, or of the valve or engine timing, solenoid valve 18 interrupts the gas flow at gas-injection nozzle 13 after a specific time, so that an intermittent or pulsating gas flow 15 is formed synchronously to the movements of intake valve 7. If required by the mixing and combustion process, one can also commence with injecting gas spray 15 before valve 7 opens annular gap 8. In this case, there is a premixing of air and gaseous fuel in intake passage 6, which can be expedient for certain operating states of the combustion engine. It is also possible to first interrupt gas spray 15 after valve 7 has closed, so that the supplying of gaseous fuel, or its mixing with the supplied air can be controlled within a broad range. The method according to the present invention and the corresponding arrangement makes this possible because the gas spray 15 that is produced is injected both through the end region of intake passage 6, as well as directly into combustion chamber 5.

Both in the case of a configuration of one gas-injection nozzle 13, or also a configuration of a plurality of nozzles 13, 13' per intake passage 6, each gas-injection nozzle 13 can also have a plurality of, e.g. two discharge passages 14. By varying the alignment of flow axes 16 of these two discharge passages 14, one can additionally intensify the turbulence in combustion chamber 5 and further improve the mixing operation. By this means, it is also possible, however, to additionally influence the combustion process in combustion chamber 5. The method according to the present invention and the corresponding devices also permit introducing other devices in intake passage 6 of gas-injection nozzle 13 to admix fuel with the air. This can be beneficial when combustion engine 1 is to be operated with different fuels. Since the method according to the present invention for forming a mixture and the corresponding devices do not necessitate any built-in components in the area of combustion chamber 5, an operation with supplementary fuels or other fuels is facilitated.

What is claimed is:

1. A method for forming a turbulent fuel-air mixture in a combustion chamber of a cylinder of an internal combustion engine, the cylinder being controlled by movement of an intake valve, the movement of the intake valve to an open position forming an annular gap, the combustion chamber being coupled to an air intake passage and an injection nozzle via the intake valve, the method comprising the steps of:

supplying a gaseous fuel to the injection nozzle;

forming a coherent gas spray in the nozzle from the gaseous fuel;

directing the coherent gas spray into the combustion chamber via the air intake passage and the annular gap at a high velocity so that the gas spray does not substantially mix with air in the air intake passage; and mixing the gaseous fuel of the coherent gas spray with air in the combustion chamber when the coherent gas spray is injected into the combustion chamber via the annular gap and when the coherent gas spray impacts a wall of the combustion chamber, a high turbulence being generated by the kinetic energy of the coherent gas spray in the combustion chamber.

2. The method according to claim 1, wherein the gas spray is intermittently injected into the combustion chamber as a function of an opening time of the intake valve.

3. The method according to claim 1, wherein the high velocity of the coherent gas spray through the air intake passage is at least 250 meters per second.

4. The method according to claim 1, wherein the combustion chamber has a longitudinal axis, and wherein the coherent gas spray is injected into the combustion chamber in one of a first direction having an angle to the longitudinal axis and a second direction eccentrically to the longitudinal axis, a vortex being generated in the combustion chamber.

5. The method according to claim 1, wherein the injection nozzle forms a plurality of coherent gas sprays and the combustion chamber has a combustion cycle, a quantity of gaseous fuel required for the combustion cycle being distributed over the plurality of coherent gas sprays.

6. The method according to claim 2, wherein a flow duration of each intermittent gas spray is controlled as a function of the time that the gaseous fuel is injected into the air intake passage and as a function of one of advance timing and lag timing compared to the opening time of the intake valve.

7. A device for forming a turbulent fuel-air mixture of a cylinder of an internal combustion engine, comprising:

a cylinder-piston unit including a combustion chamber, an intake valve and an intake passage, the intake valve being moveable with respect to a valve seat, an annular gap being formed when the intake valve is in an open position;

an air supply line coupled to the intake passage;

a fuel supply line coupled to the intake passage; and an injection nozzle connected to the fuel supply line and disposed near the intake passage and upstream of the valve seat, the injection nozzle having an outlet passage, a gas spray formed from a gaseous fuel being emitted from the outlet passage into the intake passage, a flow axis of the gas spray passing through the annular gap into the combustion chamber, wherein, when the gas spray impacts a wall of the combustion chamber, the gas spray is mixed with air in the combustion chamber.

8. The device according to claim 7, wherein the outlet passage of the injection nozzle includes an acceleration passage for accelerating the gaseous fuel, and the outlet passage has an end region which is designed as a Laval nozzle.

9. The device according to claim 7, wherein the injection nozzle further includes a solenoid valve for interrupting the gas spray emitted from the injection nozzle, a timing of the opening and closing of the solenoid valve being linked via a control to a timing of the opening and closing of the intake valve.

10. The device according to claim 7, wherein the gas spray emerging from the injection nozzle is compact and coherent.

11. The device according to claim 7, wherein the injection nozzle includes a plurality of injection nozzles arranged in the intake passage.

12. The device according to claim 7, wherein the injection nozzle includes a plurality of outlet passages, each of the plurality of outlet passage producing a respective gas spray.

13. The device according to claim 11, wherein each of the plurality of injection nozzles has a plurality of outlet passages, each of the plurality of outlet passages producing a respective gas spray.

14. The device according to claim 7, further comprising a device for admixing fuel with air disposed in the intake passage upstream from the injection nozzle.

15. The device according to claim 7, wherein the injection nozzle has a first longitudinal axis and the outlet passage attached to the injection nozzle has a second longitudinal axis, the first longitudinal axis being at an angle relative to the second longitudinal axis.

16. A device for forming a turbulent fuel-air mixture in a cylinder of an internal combustion engine, comprising:

a cylinder-piston unit including a combustion chamber, an intake valve, an intake passage, and an injection nozzle for fuel, wherein a movement of the intake valve to an open position forms an annular gap, wherein the injection nozzle is arranged in the area of the intake passage upstream from the intake valve, the injection nozzle having an outlet passage for a fuel spray, the outlet passage being directed into the intake passage, the fuel spray having a flow axis emerging from the outlet passage, the flow axis extending through the annular gap and into the combustion chamber, and wherein, when the fuel spray impacts a wall of the combustion chamber, the fuel spray is mixed with air in the combustion chamber.

17. A device for forming a turbulent fuel-air mixture in a cylinder of an internal combustion engine, comprising:

a cylinder-piston unit including a combustion chamber, an intake valve, an intake passage, and an injection nozzle for fuel;

wherein the injection nozzle is arranged in the area of the intake passage, upstream from the intake valve, the injection nozzle having an outlet passage for a fuel spray, the outlet passage being directed into the intake passage, the fuel spray having a flow axis emerging from the outlet passage and running through the intake valve and entering the combustion chamber, wherein an air flow in the intake passage flows in the direction of the combustion chamber and wherein the fuel spray substantially maintains a compact and coherent shape as it travels into the combustion chamber, there being no substantial mixing between the fuel flow and the air flow prior to entering the combustion chamber, and wherein, when the fuel spray impacts a wall of the combustion chamber, the fuel spray is mixed with the air flow in the combustion chamber.

18. The device according to claim 17, wherein the outlet passage of the injection nozzle includes an acceleration passage for accelerating a gaseous fuel, and the outlet passage includes an end region which is designed as a Laval nozzle.

19. The device according to claim 18, wherein the fuel flow is injected with a velocity of at least 250 meters/second through the intake passage and the velocity of the fuel flow is not dependent on a speed of the internal combustion engine.

20. A device for forming a turbulent fuel-air mixture in a cylinder of an internal combustion engine, comprising:

a cylinder-piston unit including a combustion chamber, an intake valve, an intake passage, and an injection nozzle for fuel, wherein the injection nozzle is arranged in the area of the intake passage, upstream from the intake valve, the injection nozzle having an outlet passage for a fuel spray, the outlet passage being directed into the intake passage, the fuel spray having a flow axis emerging from the outlet passage and running through the intake valve and entering the combustion chamber, and wherein, when the fuel spray impacts a wall of the combustion chamber, the fuel spray mixes with an air flow after entering the combustion chamber.

* * * * *